(12) United States Patent
Narkis et al.

(10) Patent No.: US 8,729,151 B2
(45) Date of Patent: May 20, 2014

(54) ARTIFICIAL MARBLE AND METHODS

(75) Inventors: Moshe Narkis, Haifa (IL); Ronit Simhony, Binyamina (IL)

(73) Assignee: Caesarstone Sdot-Yam Ltd., Kibbutz Sdot Yam (IL)

( * ) Notice: Subject to any disclaimer, the term of this patent is extended or adjusted under 35 U.S.C. 154(b) by 233 days.

(21) Appl. No.: 13/138,337

(22) PCT Filed: Feb. 2, 2010

(86) PCT No.: PCT/IB2010/050448
§ 371 (c)(1),
(2), (4) Date: Dec. 19, 2011

(87) PCT Pub. No.: WO2010/089697
PCT Pub. Date: Aug. 12, 2010

(65) Prior Publication Data
US 2012/0095127 A1    Apr. 19, 2012

Related U.S. Application Data

(60) Provisional application No. 61/202,169, filed on Feb. 3, 2009.

(51) Int. Cl.
*C09D 5/16* (2006.01)
*A01N 59/16* (2006.01)
*C08K 3/10* (2006.01)
*C08K 3/34* (2006.01)
*C08K 3/40* (2006.01)

(52) U.S. Cl.
USPC ........... 523/122; 524/398; 524/403; 524/493; 524/442; 524/494

(58) Field of Classification Search
USPC ........... 523/122; 524/398, 403, 493, 494, 442
See application file for complete search history.

(56) References Cited

U.S. PATENT DOCUMENTS

| | | | |
|---|---|---|---|
| 6,264,936 B1 | 7/2001 | Sawan et al. | |
| 2005/0106336 A1* | 5/2005 | Ong et al. | 428/15 |
| 2005/0154361 A1 | 7/2005 | Sabesan | |
| 2011/0229838 A1* | 9/2011 | Kalgutkar et al. | 433/9 |

OTHER PUBLICATIONS

International Search Report for PCT/IB10/05044 dated Jul. 6, 2010.
International Search Report for PCT/IB2010/050448 dated Jul. 6, 2010.

* cited by examiner

*Primary Examiner* — Kriellion Sanders
(74) *Attorney, Agent, or Firm* — Eitan, Mehulal & Sadot

(57) ABSTRACT

There is provided an artificial marble that includes antimicrobial substance, wherein the antimicrobial substance comprises less that about 0.002% (dry weight) of the artificial marble composition.

24 Claims, 1 Drawing Sheet

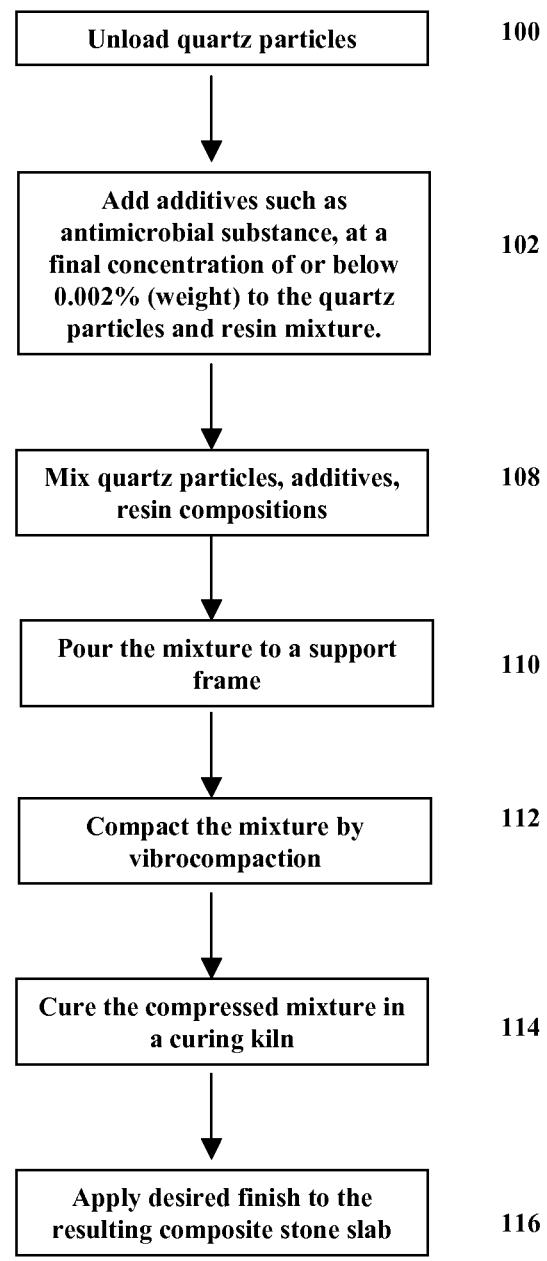

ARTIFICIAL MARBLE AND METHODS

This application is a national filing application from PCT application PCT/IB2010/050448, filed Feb. 2, 2010, which claims priority from U.S. Provisional Patent Application No. 61/202,169, filed Feb. 3, 2009, both of which applications are hereby incorporated in their entirety by reference.

BACKGROUND

As compared to natural stone compositions, such as granite and marble, composite stone material, such as quartz containing stone material is stronger and more durable. In addition, quartz containing stone material may be cleaner, safer and more consistent than other stone surfaces. Furthermore, quartz containing stone material may be more resistant to: breakage, scratching, stain, heat, chemicals, freeze-thaw damage and the like.

Composite stone material, such as, for example, artificial marble, may be found in various settings and may be used for various purposes, such as, for example: interior wall cladding, fireplace mantles and surroundings, wainscots and wall bases, bank teller lines, tables and desktops, elevator cab walls and floors, floor tile and stair treads, food service areas, shower and tub surrounds, toilet compartment partitions, window seats, countertops and backlashes.

In order to provide the composite stone material with additional desired properties, various additives may be used. The additives may be added before, during and/or after the preparation process of the composite stone material, and may be used to fine-tune the properties of the composite stone for its intended use.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other advantages or improvements.

According to some embodiments, there is provided artificial marble that includes an antimicrobial substance, wherein the antimicrobial substance comprises about 0.002% (dry weight) of the artificial marble composition, or less.

According to further embodiments, there is provided artificial marble that includes an antimicrobial substance, wherein the antimicrobial substance comprises about 0.0012% (dry weight) of the artificial marble composition, or less.

According to some embodiments, the antimicrobial substance may include Silver, Silver ions, Silver salts, or any combination thereof. The antimicrobial substance may be active in the presence of bacteria, fungi, mold, or any combination thereof. According to other embodiments, the antimicrobial agent does not leach from the artificial marble.

According to additional embodiments, the antimicrobial substance may inhibit and/or prevent growth of microorganisms on an external surface of the artificial marble. The antimicrobial substance may eradicate microorganisms on an external surface of the artificial marble.

According to additional embodiments, the artificial marble may be used for interior wall cladding, wall base, desktops, elevator cab walls, floor tile, shower surrounds, tub surrounds, toilet compartment partitions, window seats, countertops, or any combination thereof.

According to some embodiments, there is provided a method of producing artificial marble comprising an antimicrobial substance, said method comprising adding an antimicrobial substance at a concentration of about 0.002% or less (dry weight) to the artificial marble raw material composition. The antimicrobial substance may be at a concentration of about 0.0012% or less (dry weight).

According to further embodiments, the antimicrobial substance of the method may include Silver, Silver ions, Silver salts, or any combination thereof. The antimicrobial substance may be active in the presence of bacteria, fungi, mold, or any combination thereof. The antimicrobial substance may not leach from the artificial marble. The antimicrobial substance may inhibit and/or prevent growth of microorganisms on an external surface of the artificial marble. The antimicrobial substance may eradicate microorganisms on an external surface of the artificial marble.

In addition to the exemplary aspects and embodiments described above, further aspects and embodiments will become apparent by reference to the figures and by study of the following detailed descriptions.

BRIEF DESCRIPTION OF THE FIGURES

FIG. 1—schematic block diagram of a method for preparation of composite stone, according to some embodiments;

DETAILED DESCRIPTION

In the following description, various aspects of the disclosure will be described. For the purpose of explanation, specific configurations and details are set forth in order to provide a thorough understanding of the disclosure. However, it will also be apparent to one skilled in the art that the disclosure may be practiced without specific details being presented herein. Furthermore, well-known features may be omitted or simplified in order not to obscure the disclosure.

As referred to herein, the terms "composite stone", "composite stone material", and "artificial marble", may interchangeably be used.

As referred to herein the terms "antibacterial substance", "antibacterial agent", "antimicrobial substance", "antimicrobial agent" and "active ingredient" may interchangeably be used and may relate to any substance that may inhibit, suppress, prevent, eradicate, and/or eliminate, the growth of various microorganisms, such as, for example, but not limited to: bacteria, mould, fungi, viruses, parasites, and the like. For example, but not limited to, some of the microorganisms may include: *Pseudomonas aeruginosa*, various strains of *Escherichia Coli* (*E. Coli*, such as, for example, *E. Coli* 0157), *Salmonella, Listeria monocytogenes, Legionella pneumophila, Streptococcus faecalis, Bacilus subtilis, Aspergillus niger* and *Streptococcus aureus* (MRCA).

A composite stone material, such as, for example, artificial marble, may be composed of various materials. For example, a composite stone material may be composed mainly of organic polymer(s) and inorganic quartz matrix. The inorganic quartz matrix may include a variety of quartz containing materials, such as, for example, but not limited to: sand, basalt, glass, diamond, rocks, pebbles, shells, silicon, and the like. For example, the inorganic quartz material may include sand at various particle sizes and at different combinations. Linkage between the organic and inorganic compounds may be carried out and/or facilitated by using binder molecules, such as, for example, a monofunctional silane molecule that may have the ability to bind the organic and inorganic components of the composite stone. The binders may further include a mixture of various components, such as initiators, hardeners, catalysators, binding molecules and bridges, or any combination thereof. The manufacturing process of the composite stone material may include blending of raw material (such as inorganic quartz and organic polymers, unsaturated polymers, and the like, such as polyester) at various ratios. For example, the composite stone material may include about 70-95% natural quartz aggregates to about 5-30% polymer resins. For example, the composite stone material may include about 93% natural quartz aggregates and about 7% polymer resins. In addition, any desired amounts of various additives, may be added to the blending of raw materials, at various stages of production. For example, such additives may include, colorants, dyes, pigments, chemical reagents, antimicrobial substances, fungicidal agents, and the like, or any combination thereof. As a result of adding various additives to the blending of raw materials, the additives may be present in the final composite stone product and may further change various characteristics of the composite stone. Such characteristics may include, for example, physical properties, such as: color, texture, display pattern, and the like; chemical properties, such as, for example, chemical resistance, pH properties, and the like; biological properties, such as, for example, antibacterial properties, antimicrobial properties, fungicidal properties, and the like; and mechanical properties, such as, for example, strength, scratch resistance, impact resistance, and the like. The resulting mixture may later be poured onto a support or a temporary support, such as rubber, paper, water soluble paper, silicon sheet or the like, with or without a support frame or a shaping frame, a mold such as a rubber tray mold or any other appropriate support. The mixture is poured substantially in the form of a desired slab (for example, at a size of 306 cm×144 cm with or without wall shaping). The mixture may then be compacted by a special vacuum and vibration process such as vibrocompaction at high pressure, such as about 100 Tons. Then, the compressed mixture may be placed in a curing and/or hardening kiln, for example, at a temperature in the range of 80° C. to 115° C. for 30 to 45 minutes until it hardens. After completion of the casting process, the slabs may be flattened, gauged, calibrated and polished to a high and enduring shine or any desired finish to be used at various settings, such as, for example, interior wall cladding, fireplace mantles and surroundings, wainscots and wall bases, bank teller lines, table and desktops, elevator cab walls and floors, floor tile and stair treads, food service areas, shower and tub surrounds, toilet compartment partitions, window seats and countertops.

According to some embodiments, and as mentioned above, to the blending of raw materials, various additives may be added. For example, the additives may include active ingredients, such as, for example, one or more antimicrobial substances at various concentrations. As a result of adding the antimicrobial substances, the resultant composite stone may exhibit antimicrobial properties. Such antimicrobial properties may include, for example, inhibition and/or suppression of growth of microorganisms (such as, for example, bacteria, molds, fungi, viruses, parasites or any combination thereof), on the surface of the composite stone material. For example, the antimicrobial properties may include prevention of growth of microorganisms on the surface of the composite stone. For example, the antimicrobial properties may include the eradication and/or destruction of microorganisms (such as, for example, bacteria, molds, fungi, viruses, parasites or any combination thereof) that may be present on the surface of the composite stone material.

Such composite stone material with antimicrobial properties may be desired particularly in applications wherein the finalized composite stone may be placed in an environment wherein favorable conditions for microorganism growth (such as bacteria, fungi, mould, and the like) may be found. Such environment may include, for example, relatively humid areas, such as bathrooms; areas where bacteria are more likely to be found, such as, restrooms; areas such as kitchens and the like, where food may be prepared. In such areas it is thus desirable to inhibit and/or prevent and/or eliminate the growth of the microorganism, which may impose various hazardous health conditions.

Antimicrobial substances are well known in the art and may include organic and inorganic substances. In general, antimicrobial substances may include any substance that may affect the growth of microorganisms, such as bacteria, fungi, viruses, parasites or any combination thereof. Antimicrobial substances may be used to inhibit, suppress, destroy, eradicate, prevent, eliminate, or any combination thereof, the growth of microorganisms. Antimicrobial substances may be generally divided into two groups according to their effect on microorganisms: microbicidal (kill microorganism) or microbistatic (prevent the growth of microorganisms). Numerous antimicrobial agents are known in the art that may act by various mechanisms, whereby they may exert antimicrobial activity. For example, WO 05/014256 and WO 05/049293 list various antimicrobial agents that may be used with composite material.

When choosing an antimicrobial substance to be used in composite stone material, several considerations may be taken into account: an antimicrobial substance should have such properties that present a minimal effect on the environment; the antimicrobial substance should be broad enough so it may effect a wide range of microorganisms (such as gram–, gram+, fungi, and the like) but specific enough so it has no effect on other, non-harmful organisms; the antimicrobial substance should be efficient enough such that low amounts (concentration) should suffice to exert an antimicrobial effect; the antimicrobial substance should be stable under various conditions (such as heat, pressure, stress, and the like) that may be present during the manufacturing process and/or during the use of the finalized composite stone; the antimicrobial substance should be stable over an extended period of time. In addition, the antimicrobial substance should be dispersed in the composite stone such that the contact surface with bacteria is as large as possible. For example, the antimicrobial substance should be dispersed such that it is at or in close proximity to the surface of the composite stone material. Furthermore, it is desirable that the antimicrobial substance be only active in the presence of bacteria, while in the absence of bacteria the substance may be inert to the environment.

There is thus provided, according to some embodiments, a composite stone material with antimicrobial properties. The composite stone material may include an antimicrobial substance at very low concentrations, wherein the antimicrobial substance is active only in the presence of bacteria. Such unique properties may allow the antimicrobial substance to be stable over an extended period of time during the life span of using the composite stone.

According to some embodiments, the antimicrobial substance for use with composite stone material may include an inorganic antimicrobial substance, such as, for example, Silver and/or Silver salts and/or Silver ions. The Silver and/or Silver ions and/or Silver salts may be formulated such that the Silver and/or Silver ions and/or Silver salts are trapped in a complex (matrix) with other materials and are released to the surface of the composite stone material only in the presence of bacteria, whereby the Silver and/or Silver ions and/or Silver salts are able to interact, inhibit growth, and/or destroy bacteria. The effect of the Silver and/or Silver ions and/or Silver salts on the bacteria may be exerted by several routes, such as by effecting the DNA of the bacteria, by effecting the walls and/or membranes of the bacteria, by effecting the bacteria proteins, and any combination thereof.

According to some exemplary embodiments, the antimicrobial substance may include, for example, Silver-chloride, which may be held in a matrix, for example, by Titanium dioxide. Under various conditions, such as, for example, in the presence of water and/or humidity the Silver-chloride may not be released from the matrix, and thus the active substance (such as the Silver/Silver-chloride) is not unnecessarily consumed. The Silver-chloride may be released from the matrix only in the presence of very strong negative ions. Such strong negative ions may be found, for example on the Thiol groups that are found in bacterial proteins. Thus, when bacteria are present, the strong negative ions of the bacterial proteins cause the Silver-chloride to be released from the matrix, and hence the Silver-chloride may readily "attack" the bacteria. Due to the matrix, which traps the Silver-chloride salts until the ions are used, the antimicrobial substance may be highly selective, and thus minute amounts may be used in the composite stone.

According to further embodiments, since the Silver and/or Silver ions and/or Silver salts are not consumed under humid conditions, the effective life span of the antimicrobial substance may be extended. For example, simulation experiments have demonstrated that after 10 years of use, the antimicrobial substance, and hence the composite stone that contains the antimicrobial substance still exhibits antimicrobial properties. Moreover, the antimicrobial properties may be stable under extreme conditions of heat and pressure, and the substance is thus suitable to be used in the process for the preparation of the composite stone. For example, the antimicrobial properties of the antimicrobial substance may be stable at temperatures of up to 600° C.

According to some embodiments, an antimicrobial substance, such as Silver and/or Silver ions and/or Silver salts, may be added at various concentrations to the blend of composite material. For example, the antimicrobial substance may be added at a concentration of less than about 100 parts per million (ppm). For example, the antimicrobial substance may be added at a concentration of less than about 75 parts per million (ppm). For example, the antimicrobial substance may be added at a concentration of less than about 50 parts per million (ppm). For example, the antimicrobial substance may be added at a concentration of less than about 25 parts per million (ppm). For example, the antimicrobial substance may be added at a concentration of less than about 20 parts per million (ppm). For example, the antimicrobial substance may be added at a concentration of less than about 15 parts per million (ppm). For example, the antimicrobial substance may be added at a concentration of less than about 12 parts per million (ppm). For example, the antimicrobial substance may be added at a concentration of less than about 10 parts per million (ppm). For example, the antimicrobial substance may be added at a concentration of less than about 5 parts per million (ppm). For example, the antimicrobial substance may be added at a concentration of less than about 1 parts per million (ppm). Experiments testing composite stone material with antimicrobial properties have surprisingly demonstrated that adding an antimicrobial substance, such as Silver and/or Silver ions and/or Silver salts at a concentration of below 0.002% (dry weight), which is equivalent to a quantity of less than about 20 parts per million (ppm), to the blend of composite stone material may suffice to provide the composite stone material with antimicrobial properties. For example, adding an antimicrobial substance at a concentration of about 0.02% (dry weight), which includes about 10% of Silver and/or Silver ions and/or Silver salts, to a blend of composite material may suffice to provide the composite stone material with antimicrobial properties. Since the concentration of the Silver ion in the antimicrobial substance is about 10%, the final concentration of Silver and/or Silver ions and/or Silver salts in the composite stone material is below about 0.002% (dry weight). This means that the quantity of the Silver and/or Silver ions and/or Silver salts in the composite stone is below 20 parts per million (ppm), which is an extremely low concentration that is several folds lower than the concentration reported to have been used in the art. For example, adding an antimicrobial substance at a concentration of about 0.012% (dry weight), which includes about 10% of Silver and/or Silver ions and/or Silver salts, to a blend of composite material may suffice to provide the composite stone material with antimicrobial properties. Since the concentration of the Silver ion in the antimicrobial substance is about 10%, the final concentration of Silver and/or Silver ions and/or Silver salts in the composite stone material is below about 0.0012% (dry weight). This means that the quantity of the Silver and/or Silver ions and/or Silver salts in the composite stone is below 12 parts per million (ppm), which is an extremely low concentration that is several folds lower than the concentration reported to have been used in the art.

Several experiments may be performed to test the antimicrobial properties of a composite stone material (manufactured as detailed hereinbelow) having an active ingredient (antimicrobial substance, such as Silver and/or Silver ions and/or Silver salts), at a concentration of below about 0.002% (dry weight), such as, for example, a concentration of 0.0012% (dry weight). The experiments may be performed, for example, under ISO 22196, which is based on the Japanese Industrial Standard ("JIS", JIS Z 2801 (2000)), "Determination of Antibacterial Activity using Test", the content of which is incorporated herein by reference in its entirety. Briefly, the method of testing (as detailed in Example 1, hereinbelow), is outlined as follows: antimicrobial activity is measured by quantifying the survival of bacterial cells which have been held in intimate contact for any period of time (such as, for example, 24 hours) at any desired temperature (such as, for example, at 35° C.) with a surface, such as a composite stone, that contains an antibacterial substance. The antimicrobial effect may be measured by comparing the survival of microorganisms, such as, for example, bacteria, with the survival achieved on a control surface (having no additive active ingredient). The data thus obtained may be generally expressed as an antimicrobial value calculated from the difference between the $Log_{10}$ number of colony forming units (CFU) on the surface comprising an antimicrobial substance) with that measured on the control surface. In addition, validation of the results thus obtained may further be performed. For example, the variability of the number of CFU recovered from a control surface prior to incubation should be within a specified range. For example, the microorganism population present on the control surface after incubation should not be greater than 2 orders of magnitude lower than that recovered prior to incubation. Where an increase in the population recovered from the control surface is observed, any antimicrobial effect is calculated using the population recovered from the control surface, prior to incubation.

According to additional exemplary embodiments, as demonstrated, for example, in Examples 1 and 2, composite stone material comprising 0.002% (dry weight) or less of antimicrobial substance, such as Silver and/or Silver ions and/or Silver salts, exhibit on average a greater than 95% reduction of bacterial. For example, composite stone material slabs comprising 0.0012% (dry weight) of antimicrobial substance, such as Silver and/or Silver ions and/or Silver salts, exhibit an antimicrobial value in the range of about 97.1%-99.99%. This high antimicrobial value indicates that the composite stone material which comprises about 0.002% (dry weight) or less (such as, for example, 0.0012% (dry weight)) of an antimicrobial substance, indeed possesses antimicrobial properties, such that it inhibits bacterial growth on the surface of the composite stone material.

The novel use of such low concentration/amount of an antimicrobial substance to produce a composite stone with highly effective antimicrobial properties may provide substantial advantages, such as, for example, by increasing the safety of using the composite stone with the antimicrobial properties.

According to some embodiments, the antimicrobial substance may be added to the blend of raw material at various stages and in various forms, such that the antimicrobial substance is distributed evenly or non-evenly throughout the composite stone. For example, the antimicrobial substance may be added as is, in the form of a powder; for example, the antimicrobial substance may be added as is, in the form of a liquid; for example, the antimicrobial substance may be premixed with a carrier, such as a liquid carrier, prior to being added to the blend of raw material; for example, the antimicrobial substance may be premixed with other ingredients of the composite stone material, such as, for example, quartz particles; for example, the antimicrobial substance may be added in combination with other ingredients of the composite stone material, such as, for example, colorants, binders, quartz particles, and the like; for example, the antimicrobial substance may be added more than one time during the preparation process of the composite stone material; for example, the antimicrobial substance may be dispersed in the blend of composite stone material such that it is dispersed at or in close proximity to the surface of the hardened composite stone; for example, the antimicrobial substance may be added to the hardened composite stone, for example by coating of the surface of the composite stone; or any combination thereof.

According to some exemplary embodiments, there is thus provided a method for preparation of a composite material with antimicrobial properties. The method may include such routine steps of preparation of a composite stone material as mentioned above herein. The method may include modifications to the method, such as for example, by adding one or more steps wherein an antimicrobial substance may be added to the blend of raw material.

According to some exemplary embodiments, reference is now made to FIG. 1, which schematically illustrates a method for preparation of composite stone, according to some embodiments. Thus, as exemplified in FIG. 1, the method for preparation of composite stone that possesses antimicrobial properties may include the following steps: unload quartz particles (for example into a mixer), such as shown in Step 100. Then, resins composition and one or more additives may be added. For example, the additives may include a colorant (in the form of a powder or a liquid). The additive may include one or more antimicrobial substances (Step 102). The antimicrobial substances may be in the form of a powder, a liquid, a paste, or any combination thereof. For example, the final quantity of the antibacterial substance may be lower than about 100 ppm. For example, the final quantity of the antibacterial substance may be lower than about 50 ppm. For example, the antimicrobial substance may be added in the form of a powder at a concentration of about 0.002% (dry weight) of the final mixture, such that the final quantity of the antibacterial substance may be lower than about 20 ppm. For example, the antimicrobial substance may be added in the form of a powder at a concentration of about 0.0012% (dry weight) of the final mixture, such that the final quantity of the antibacterial substance may be lower than about 12 ppm. For example, the final quantity of the antibacterial substance may be lower than about 10 ppm. For example, the final quantity of the antibacterial substance may be lower than about 1 ppm. According to some embodiments, the antimicrobial substance may be premixed with quartz particles and resin mixture, prior to addition of additional additives. The quartz particles, resins composition, and the one or more additives may be mixed (Step 108). Upon mixing of the blend of raw materials at predetermined speed(s) for predetermined time period(s), the resulting mixture may be poured (Step 110) to a support, which is substantially in the form of a desired slab. Next, the mixture may be compacted (Step 112) by vibro-compaction. Then, the compressed mixture may be placed in a curing and/or hardening kiln (Step 114). After completion of the casting process, the composite stone slab may be flattened, gauged, calibrated and/or polished to a desired finish (Step 116).

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions and sub-combinations as are within their true spirit and scope.

EXAMPLES

Example 1

Antimicrobial Activity of Composite Stone Comprising an Antimicrobial Substance

The antimicrobial testing of various composite stone materials comprising an antimicrobial substance, such as Silver and/or Silver ions and/or Silver salts was performed substantially as outlined by ISO 22196, which is based on the Japanese Industrial Standard method (JIS Z 2801: 2000) and is summarized hereinbelow:

A cell suspension of *Escherichia coli* ($2.5 \times 10^5$-$1.0 \times 10^6$ cells ml-1; NCIMB 845) or *Staphylococcus aureus* ($2.5 \times 10^5$-$1.0 \times 10^6$ cells ml-1; (MRCA) ATCC 6538p) is prepared in $\frac{1}{500}$ nutrient broth. An aliquot (400 µl) is placed onto at least 3 replicate sub-samples per species of the composite stone surface, which includes the antimicrobial substance under test and 6 replicate sub-samples per species of a control surface (which does not contain an antimicrobial substance). The aliquots are held in intimate contact, using a sterile polyethylene film (typically 40×40 mm on a test piece measuring 50×50 mm). The 3 replicate sub-samples of the tested surface containing the antimicrobial substance and 3 of the 6 replicate sub-samples of the control surface are then incubated for 24 hours at 35° C. at saturation humidity. If needed, after incubation, the samples are transferred to individual containers containing an aliquot (typically 10 ml) of a neutralizing agent validated for the antimicrobial substance used in the composite stone material. The film is separated from the surface and the suspension remaining on the surface homogenized with the neutralizer. Three replicate sub-samples of the untreated material are also processed in this manner prior to incubation to provide baseline data. The number of colony forming units within the resulting suspensions are then enumerated using an appropriate microbiological technique (for example, pour plate, spiral dilution and the like). The data thus obtained may be generally expressed as an antimicrobial value calculated from the difference between the $Log_{10}$ number of colony forming units (CFU) on the surface comprising an antimicrobial substance with that measured on the control surface. In addition, validation of the results thus obtained may further be performed. For example, the variability of the number of CFU recovered from a control surface prior to incubation should be within a specified range. For example, the microorganism population present on the control surface after incubation should not be greater than 2 orders of magnitude lower than that recovered prior to incubation. Where an increase in the population recovered from the control surface is observed, any antimicrobial effect is calculated using the population recovered from the control surface, prior to incubation.

The results of the reduction in antimicrobial values (against *E. Coli*) tested on various composite stone slabs containing 0.0012% (dry weight) antimicrobial substance are presented in Table 1, herein below. The control slab is a composite stone material slab, which does not contain any antimicrobial substance. For each antimicrobial slab, a control slab is tested in parallel.

TABLE 1

| Slab No. | Species | Contact time 0 Hrs | Contact time 0 Hrs | Reduction (compared to control) Log 10 | Reduction (compared to control) % |
|---|---|---|---|---|---|
| 1 | E. Coli | 1.3E+04 | 6.2E+02 | 2.3 | 99.53% |
| Control (for slab 1) | E. Coli | 1.3E+04 | 1.3E+05 | | |
| 2 | E. Coli | 1.3E+04 | <11.11 | ≥4.73 | ≥99.99% |
| Control (for slab 2) | E. Coli | 1.3E+04 | 5.9E+05 | | |
| 3 | E. Coli | 1.3E+04 | <11.11 | ≥4.52 | ≥99.99% |
| Control (for slab 3) | E. Coli | 1.3E+04 | 3.7E+05 | | |
| 4 | E. Coli | 1.3E+04 | 5.9E+04 | 1.5 | 97.14% |
| Control (for slab 4) | E. Coli | 1.3E+04 | 2.1E+06 | | |
| 5 | E. Coli | 1.3E+04 | <11.11 | ≥3.63 | ≥99.98% |
| Control (for slab 5) | E. Coli | 1.3E+04 | 4.7E+04 | | |
| 6 | E. Coli | 1.5E+04 | <11.11 | ≥3.86 | ≥99.99% |
| Control (for slab 6) | E. Coli | 1.5E+04 | 8.0E+04 | | |
| 7 | E. Coli | 1.1E+04 | 1.4E+01 | 3.8 | 99.98% |
| Control (for slab 7) | E. Coli | 1.1E+04 | 8.1E+04 | | |
| 8 | E. Coli | 5.8E+03 | 4.5E+03 | 1.7 | 97.8% |
| Control (for slab 8) | E. Coli | 5.8E+03 | 2.1E+05 | | |
| 9 | E. Coli | 1.1E+04 | <11.11 | ≥3.83 | ≥99.99% |
| Control (for slab 9) | E. Coli | 1.1E+04 | 7.5E+04 | | |
| 10 | E. Coli | 1.1E+04 | 8.0E+02 | 2.1 | 99.27% |
| Control (for slab 10) | E. Coli | 1.1E+04 | 1.1E+05 | | |

Example 2

Antimicrobial Activity of Aged Composite Stone Slab Comprising an Antimicrobial Substance The results of the experiment presented in Example 2, were performed essentially as described in Example 1. For the experiments, aged composite stone slabs were used. By "aged" it is meant that the slabs were processed in a dishwasher for 15 cycles, before being put to the antimicrobial activity tests, as described above. The "aging" treatment simulate 10 years of use of the composite stone slab.

The results of the reduction in antimicrobial values (against *E. Coli*) tested on various aged composite stone slabs containing 0.0012% (dry weight) antimicrobial substance are presented in Table 1, herein below. The control slab is an aged composite stone material slab, which does not contain any antimicrobial substance. For each antimicrobial slab, a control slab is tested in parallel.

| Slab No. | Species | Contact time 0 Hrs | Contact time 0 Hrs | Reduction (compared to control) Log 10 | Reduction (compared to control) % |
|---|---|---|---|---|---|
| 1 | E. Coli | 1.8E+04 | <11.11 | >2.86 | >99.86% |
| Control (for slab 1) | E. Coli | 8.5E+03 | 8.1E+03 | | |
| 2 | E. Coli | 1.8E+04 | <11.11 | >2.26 | >99.44% |
| Control (for slab 2) | E. Coli | 8.5E+03 | 2.0E+03 | | |
| 3 | E. Coli | 1.8E+04 | <11.11 | >3.88 | >99.99% |
| Control (for slab 3) | E. Coli | 8.5E+03 | 8.4E+04 | | |
| 4 | E. Coli | 1.8E+04 | <11.11 | >4.4 | >99.99% |
| Control (for slab 4) | E. Coli | 8.5E+03 | 2.8E+05 | | |

What we claim is:

1. A countertop artificial marble slab comprising:
    a vibro-compacted mixture of (a) an organic polymer, (b) an inorganic quartz material, (c) a binder to link the organic polymer and the inorganic quartz material, and (d) an antimicrobial substance;
    wherein said antimicrobial substance when measured in dry state comprises about 0.002% or less of the composite stone material, wherein the antimicrobial substance comprises Silver-chloride held in a matrix with Titanium-dioxide,
    wherein a concentration of the Silver-chloride relative to the countertop artificial marble slab is between 1 and 100 parts-per-per-million.

2. The countertop artificial marble slab according to claim 1, wherein said antimicrobial substance comprises Silver, Silver ions, Silver salts, or any combination thereof.

3. The countertop artificial marble slab according to claim 1, wherein said antimicrobial substance is active in the presence of bacteria, fungi, mold, or any combination thereof.

4. The countertop artificial marble slab according to claim 1, wherein said antimicrobial substance does not leach from the composite stone.

5. The countertop artificial marble slab according to claim 1, wherein the antimicrobial substance inhibits and/or prevents growth of microorganisms on an external surface of the composite stone material.

6. The countertop artificial marble slab according to claim 1, wherein said quartz containing stone material is composed of at least one organic polymer and an inorganic quartz matrix.

7. The countertop artificial marble slab according to claim 1, wherein said inorganic quartz matrix comprises one or more materials selected from the group consisting of: sand, basalt, glass, glass, diamond, rocks, pebbles, shells, silicon.

8. The artificial marble slab according to claim 6, wherein said inorganic quartz matrix comprises sand at various particle sizes and at different combinations.

9. The countertop artificial marble slab according to claim 6, further comprising binder molecules.

10. The countertop artificial marble slab according to claim 9, wherein said binder molecules comprise a monofunctional silane molecule.

11. The countertop artificial marble slab according to claim 9, wherein said binder molecules comprise one or more materials selected from the group consisting of: initiators, hardeners, catalysts, binding molecules, and bridges.

12. The countertop artificial marble slab according to claim 6, wherein said composite stone material comprises 70-95% quartz containing stone material and 5-30% organic polymer.

13. The countertop artificial marble slab according to claim 12, wherein said composite stone material comprises 93% quartz containing stone material and 7% organic polymer.

14. The countertop artificial marble slab according to claim 12, wherein said composite stone material is natural quartz aggregates, and wherein said organic polymer is a polymer resin.

15. The countertop artificial marble slab according to claim 1, further comprising at least one additive.

16. The countertop artificial marble slab according to claim 15, wherein said at least one additive comprises one or more materials selected from the group consisting of: colorants, dyes, pigments, chemical reagents, fungicidal agents.

17. The countertop artificial marble slab according to claim 1, wherein the antimicrobial substance is distributed evenly throughout the countertop artificial marble slab.

18. The countertop artificial marble slab according to claim 1, wherein the antimicrobial substance is distributed non-evenly throughout the countertop artificial marble slab.

19. The countertop artificial marble slab according to claim 1, wherein the antimicrobial substance is in powder form when blended with the organic polymer and the inorganic quartz material.

20. The countertop artificial marble slab according to claim 1, wherein the antimicrobial substance is in liquid form when blended with the organic polymer and the inorganic quartz material.

21. The countertop artificial marble slab according to claim 1, wherein the antimicrobial substance comprises an antimicrobial material pre-mixed with a liquid carrier.

22. The countertop artificial marble slab according to claim 1, wherein the antimicrobial substance comprises an antimicrobial material pre-mixed with quartz particles.

23. The countertop artificial marble slab according to claim 1, wherein the antimicrobial substance comprises an antimicrobial material pre-mixed with one or more colorants.

24. The countertop artificial marble slab according to claim 1, wherein the antimicrobial substance comprises an antimicrobial material pre-mixed with one or more binders.

* * * * *